(12) United States Patent
Fang et al.

(10) Patent No.: US 9,331,863 B2
(45) Date of Patent: May 3, 2016

(54) HOME NETWORK, METHOD FOR SHARING DEVICE INFORMATION AMONG HOME NETWORKS AND HOME NETWORK SYSTEM

(75) Inventors: Ping Fang, Shenzhen (CN); Huangwei Wu, Shenzhen (CN); Qinliang Zhang, Shenzhen (CN); Yu Zhu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 625 days.

(21) Appl. No.: 13/283,178

(22) Filed: Oct. 27, 2011

(65) Prior Publication Data
US 2012/0042074 A1 Feb. 16, 2012

Related U.S. Application Data

(63) Continuation of application No. PCT/CN2010/071903, filed on Apr. 20, 2010.

(30) Foreign Application Priority Data

Apr. 27, 2009 (CN) .......................... 2009 1 0139236

(51) Int. Cl.
*G06F 15/173* (2006.01)
*H04L 12/28* (2006.01)
*H04L 29/06* (2006.01)

(52) U.S. Cl.
CPC ........ *H04L 12/2821* (2013.01); *H04L 12/2832* (2013.01); *H04L 63/20* (2013.01)

(58) Field of Classification Search
USPC ........................................................ 709/225
See application file for complete search history.

(56) References Cited

U.S. PATENT DOCUMENTS 7,263,552 B2 * 8/2007 Govindarajan et al. ....... 709/224
7,921,194 B2    4/2011 Song et al.
(Continued)

FOREIGN PATENT DOCUMENTS

CN          1747422 A     3/2006
CN       101064628 A    10/2007
(Continued)

OTHER PUBLICATIONS

Office Action issued in corresponding Chinese Patent Application No. 200910139236.2, mailed Apr. 28, 2013, 19 pages.
(Continued)

*Primary Examiner* — Esther B Henderson
(74) *Attorney, Agent, or Firm* — Brinks Gilson & Lione (57) ABSTRACT

In the field of communications technologies, a home network, a method for sharing device information among home networks and a home network system are provided. The home network system includes a first home network, and a second home network having a first secure channel established with the first home network, so as to obtain an access policy and device information of the first home network through the first secure channel and provide the device information for a third home network having a second secure channel established with the second home network according to the access policy. Therefore, the device information is shared among the home networks, and the number of the secure channels to be established is reduced, and thereby the amount of information required to be stored and maintained is reduced.

15 Claims, 2 Drawing Sheets

(56) References Cited

U.S. PATENT DOCUMENTS

2009/0083846 A1    3/2009  Ding
2009/0254977 A1    10/2009 Ghanea-Hercock
2010/0161818 A1*   6/2010  Capuozzo et al. ............ 709/229

FOREIGN PATENT DOCUMENTS

| CN | 101167333 A    | 4/2008  |
|----|----------------|---------|
| CN | 101212384 A    | 7/2008  |
| EP | 2202939 A1     | 6/2010  |
| JP | 2001-007836    | 1/2001  |
| JP | 2004334610 A   | 11/2004 |
| JP | 2005503596 A   | 2/2005  |
| JP | 2005222399 A   | 8/2005  |
| KR | 20080000310 A  | 1/2008  |
| WO | WO 02/061653 A2 | 8/2002 |

OTHER PUBLICATIONS

Office Action issued in corresponding Korean Patent Application No. 10-2011-7027325, mailed Jun. 27, 2013, 6 pages.
Extended European Search Report issued in corresponding European Patent Application No. 10769253.5, mailed Dec. 16, 2011.
Chowdhury et al., "Interconnecting Multiple Home Networks Services" IEEE 2008.
Office Action issued in corresponding Japanese Patent Application No. 2012-507585, mailed Jul. 9, 2013, 8 pages.
Office Action issued in corresponding European Patent Application No. 10769253.5, mailed Jul. 18, 2013, 4 pages.
Office Action issued in corresponding Chinese Patent Application No. 200910139236.2, mailed Oct. 10, 2012.
Fukami et al., "An Authorization Method Using Sender ID for Dial-up based Home Network Connection" Proceedings of the 2008 IEICE General Conference, Communique 2, Japan, Institute of Electronics, Information, and Communication Engineers, Mar. 5, 2008, 3 pages.
Muto et al., "Remote Sharing Support for DLNA Appliances with Rule-based Access Control Functions" Journal of the Information Processing Society of Japan, Dec. 15, 2008, vol. 49, No. 12, 13 pages.
Written Opinion of the International Searching Authority issued in corresponding PCT Patent Application No. PCT/CN2010/071903, mailed Jul. 29, 2010.
International Search Report issued in corresponding PCT Patent Application No. PCT/CN2010/071903, mailed Jul. 29, 2010.

* cited by examiner

HOME NETWORK, METHOD FOR SHARING DEVICE INFORMATION AMONG HOME NETWORKS AND HOME NETWORK SYSTEM

CROSS-REFERENCE TO RELATED APPLICATIONS

This application is a continuation of International Application No. PCT/CN2010/071903, filed on Apr. 20, 2010, which claims priority to Chinese Patent Application No. 200910139236.2, filed on Apr. 27, 2009, both of which are hereby incorporated by reference in their entireties.

FIELD OF THE INVENTION

The present invention relates to the field of communications technologies, and in particular, to a home network, a method for sharing device information among home networks and a home network system.

BACKGROUND OF THE INVENTION

With the popularity of digital electronic products, more and more digital devices are equipped at home. In order to better control and manage these devices, these devices are connected in a wired or wireless manner to form a home network.

After the home network is formed, device information of another home network may be saved in the home network, and a secure channel for remote access may be established between the two home networks, so that the home network may access a devices corresponding to the device information through the secure channel, and thereby resource sharing between two home networks is realized.

If resource sharing is intended to be realized between more than two home networks, a secure channel needs to be established between every two home networks, and each home network needs to save device information of a home network having the secure channel established therewith, so for each home network, the secure channels to be established are excessive, and the amount of information to be saved and maintained is too large.

SUMMARY OF THE INVENTION

Embodiments of the present invention provide a home network, a method for sharing device information among home networks and a home network system, so as to realize device information sharing among home networks. In order to achieve the above objective, the embodiments of the present invention provide the following technical solutions.

An embodiment of the present invention provides a home network system, which includes:

a first home network; and a second home network, having a first secure channel established with the first home network, so as to obtain an access policy and device information of the first home network through the first secure channel and provide the device information for a third home network having a second secure channel established with the second home network according to the access policy.

An embodiment of the present invention provides a method for sharing device information among home networks, where the method includes:

obtaining an access policy and device information sent by a first home network;

determining a device accessible by a third home network according to the access policy; and providing information of the accessible device for the third home network.

An embodiment of the present invention provides a home network, which includes:

an obtaining module, configured to obtain the access policy and the device information of the first home network through the first secure channel;

a determination module, configured to determine a device that the first home network allows the third home network to access according to the access policy of the first home network; and a providing module, configured to provide information of the device determined by the determination module for the third home network through the second secure channel.

In the technical solutions provided by the embodiments of the present invention, through the secure channels between the first home network and the second home network and between the second home network and the third home network, the second home network obtains the device information and the access policy from the first home network and sends the device information to the third home network according to the access policy, so that the third home network may share the device information in the second home network. Through the technical solutions provided by the present invention, on the whole, the number of the secure channels to be established and the amount of information required to be saved and maintained are reduced.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons skilled in the art may derive other drawings from the accompanying drawings without creative efforts.

DETAILED DESCRIPTION OF THE EMBODIMENTS

Figure 1:
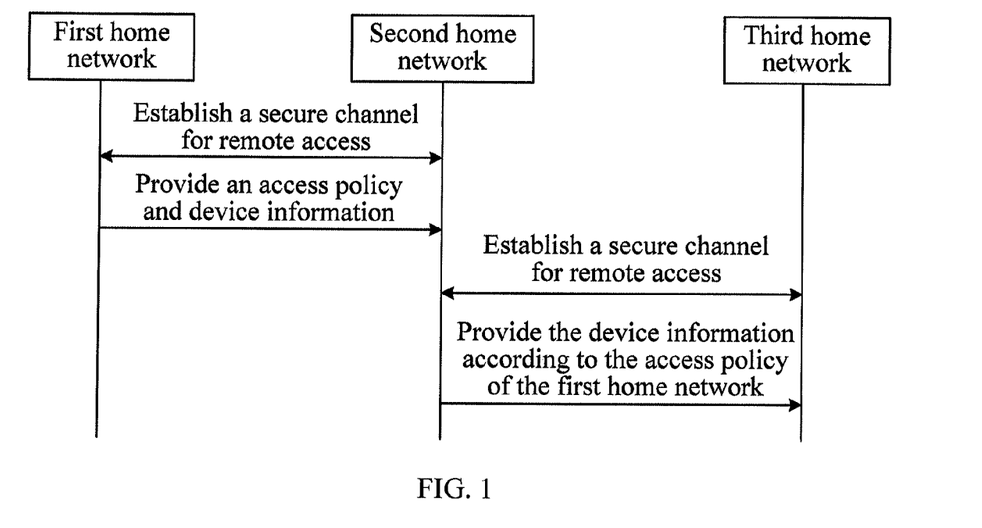
FIG. 1 is a schematic diagram of a home network system according to an embodiment of the present invention.

The technical solutions of the present invention are clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention. A home network system provided by an embodiment of the present invention is shown in FIG. 1. A first secure channel is disposed between a first home network and a second home network, and a second secure channel is disposed between the second home network and a third home network. The third home network shares device information of the first home network through the second home network.

The secure channel may be Internet Protocol Security (IP-Sec), a Virtual Private Network (VPN), or other conventional technologies, which is not limited in the present invention.

In an embodiment of the present invention, the home network system includes:

a first home network; and a second home network, having a first secure channel established with the first home network, so as to obtain an access policy and device information of the first home network through the first secure channel and provide, according to the access policy, the device information for a third home network having a second secure channel established with the second home network.

The access policy includes a right for accessing a device in the first home network. After obtaining the access policy of the first home network, the second home network determines, according to the access policy, a device in the first home network that the third home network has a right to access.

It may be seen from the embodiment that, through the secure channel between the first home network and the second home network, and the secure channel between the second home network and the third home network, the second home network obtains the device information and the access policy from the first home network and sends the device information to the third home network according to the access policy, so that the third home network may share the device information in the second home network. Through the technical solutions provided by the present invention, on the whole, the number of the secure channels to be established and the amount of information required to be saved and maintained are reduced.

In an embodiment of the present invention, the second home network in the system may include a receiving module, a determination module, and a providing module.

The receiving module is configured to receive the access policy and the device information of the first home network through the first secure channel.

The determination module is configured to determine, according to the access policy, a device that the first home network allows the third home network to access.

The received access policy of the first home network includes multiple access policies of other home networks. After establishing the secure channel with the third home network, the second home network determines whether the received access policy of the first home network includes an access policy for the third home network; if the received access policy of the first home network includes the access policy for the third home network, the second home network determines the device in the first home network accessible by the third home network according to the policy of the first home network.

The providing module is configured to provide information of the device determined by the determination module for the third home network through the second secure channel.

After determining the device information of the first home network accessible by the third home network, the second home network provides the accessible device information for the third home network.

The receiving module may receive the access policy and the device information of the first home network in the following two manners.

First Manner:

A Universal Plug and Play (UPnP) control command is added, where the control command may be named as AddPolicies. The first home network adds the access policy in a certain service of the second home network by invoking the command, and the service may be RADASync.

A parameter list of AddPolicies is as follows.

| Argument | Direction |
| --- | --- |
| AccessPolicies | Input |
| ID | Input |

Where an input parameter AccessPolicies is of a character string type, and a value of the input parameter AccessPolicies may be description of the access policy in an Extensible Markup Language (XML) format; and an input parameter ID of AddPolicies is of the character string type and is an optional parameter, and may be an identification (ID) of a device in the first home network or an ID of a home network providing the access policy.

The first home network transmits the AccessPolicies parameter to the second home network by invoking the AddPolicies command, that is, transmits the access policy to the second home network.

The receiving module of the second home network receives the access policy and the device information of the first home network that are carried in the parameter transmitted when the first home network invokes the AddPolicies command.

Second Manner:

The second home network demands the access policy from the first home network by invoking a UPnP control command.

A UPnP control command is added, where the control command may be named as GetPolicies. The second home network demands the access policy from the first home network by invoking the command.

A parameter list of the GetPolicies command is as follows.

| Argument | Direction |
| --- | --- |
| ID | Input |
| AccessPolicies | Output |
| ID | Output |

Where an input parameter ID is of the character string type and is an optional parameter, and a value of the input parameter ID may be an ID of a device in the second home network or an ID of the second home network;

an output parameter AccessPolicies is of the character string type, and a value of the output parameter AccessPolicies may be specific description of the access policy in the XML format; and an output parameter ID is of the character string type and is an optional parameter, and a status variable corresponding to the output parameter ID may be an ID of a device in the first home network or an ID of the first home network.

After knowing that the first home network establishes the secure channel with the second home network, the second home network may directly invoke the GetPolicies command. After the second home network invokes the command, the first home network sends the AccessPolicies parameter to the second home network. That is, the receiving module may first send a request for demanding the access policy of the first home network to the first home network, and then receive the access policy and the device information of the first home network that are sent by the first home network.

In this embodiment, the second home network receives the access policy and the device information of the first home network, and then determines the device accessible by the third home network according to the access policy of the first home network and provides the device information for the third home network.

In an embodiment of the present invention, the second home network in the system may include an obtaining module, a determination module, and a providing module.

The obtaining module is configured to obtain the access policy and the device information of the first home network through the first secure channel.

The determination module is configured to determine, according to the access policy, a device that the first home network allows the third home network to access.

The providing module is configured to provide information of the device determined by the determination module for the third home network through the second secure channel.

In this embodiment, the second home network actively obtains the access policy and the device information of the first home network.

In an embodiment of the present invention, for the embodiment where the second home network has the obtaining module, the first home network includes a storage module and a sending module.

The storage module is configured to store the access policy and the device information.

The sending module is configured to send an address of the access policy and the device information to the second home network through the first secure channel.

Corresponding to the AddPolices command and the GetPolicies command, the sending module sends the access policy and the device information also in two manners.

First manner: When the first home network invokes the AddPolicies command, the AccessPolicies parameter transmitted from the first home network to the second home network is an address for the storage module to store the access policy and the device information.

Second manner: When the second home network invokes the GetPolices command, the AccessPolicies parameter sent from the first home network to the second home network as a response is an address for the storage module to store the access policy and the device information.

At this time, the obtaining module in the second home network is specifically configured to obtain the access policy and the device information that are stored by the storage module through the first secure channel according to the storage address of the access policy and the device information.

The obtaining module may find the access policy and the device information of the first home network that are stored by the storage module through a network according to a Uniform Resource Locator (URL) address, so as to actively obtain the access policy and the device information.

The second home network may provide the device information for the third home network through the providing module in the following two manners.

First Manner:

A UPnP control command is added, where the control command may be named as AddRemoteDevices. The second home network adds the device information in a certain service of the third home network by invoking the command, and the service may be RADASync.

A parameter list of AddRemoteDevices is as follows.

| Argument | Direction |
| --- | --- |
| DeviceList | Input |
| ID | Input | where an input parameter DeviceList is of the character string type, and a value of the input parameter DeviceList may be description of the device information in the XML format; and an input parameter ID is of the character string type and is an optional parameter, and may be an ID of a device in the first home network or an ID of the first home network.

The second home network transmits the DeviceList parameter to the third home network by invoking the AddRemoteDevices command, that is, provides the device information for the third home network.

Second Manner:

The third home network demands the device information from the second home network by invoking a UPnP control command.

A UPnP control command is added, where the control command may be named as GetRemoteDevices. The third home network demands the device information from the second home network by invoking the GetRemoteDevices command.

A parameter list of the GetRemoteDevices command is as follows.

| Argument | Direction |
| --- | --- |
| ID | Input |
| DeviceList | Output |
| ID | Output | where an input parameter ID is of the character string type and is an optional parameter, and a value of the input parameter ID may be a device ID corresponding to device information in the third home network or an ID of the third home network;

an output parameter DeviceList is of the character string type, and a value of the output parameter DeviceList may be specific description of the device information in the XML format; and an output parameter ID is of the character string type and is an optional parameter, and a value of the output parameter ID may be a device ID corresponding to device information in the first home network or an ID of the first home network.

After establishing the secure channel with the second home network, the third home network may directly invoke the GetRemoteDevices command. After the third home network invokes the command, the second home network sends the DeviceList parameter to the third home network. That is, the third home network first sends a request for demanding the device information to the second home network, and then receives the device information of the first home network sent by the second home network.

In this embodiment, the second home network provides the device information of the first home network for the third home network according to the access policy of the first home network.

In the embodiment of the present invention, the access policy includes a right for accessing a device in the first home network. The access policy may specifically include:

(1) whether the third home network is allowed to access the device in the first home network; and (2) when the third home network is allowed to access the device in the first home network, an ID of a device allowed to be accessed and an ID of the third home network.

The access policy may be described through the XML as follows.

```
<?xml version="1.0" encoding="UT
<dads xmlns="urn:schemas-upnp-org:ra:dads"
    xmlns:xsi="http://www.w3.org/2001/XMLSchema-instance"
    xsi:schemaLocation="urn:schemas-upnp-org:ra:dads
    http://www.upnp.org/schemas/ra/dads-v1-CD-yyyymmdd.xsd">
    <AccessPolicies
        isSharable="True">
        <deviceInfo
            uuid="abcd1234-11a1-22b2-c333-01001d12e001"
            cache-control="max-age=900"
            descriptionDocument="http://10.11.85.65:52058/"
            server="Windows NT/5.0, UPnP/1.0">
            <accessControl>
                <access credentialID="home c"></access>
                <access credentialID="home f"></access>
            </accessControl>
        </deviceInfo>
        <deviceInfo
            uuid="abcd5678-55a5-66b6-c777-05005d56e005"
            cache-control="max-age=1000"
            descriptionDocument="http://10.11.85.68:53038/"
            server="Windows NT/5.0, UPnP/1.1">
            <accessControl>
                <access credentialID="home d"></access>
            </accessControl>
        </deviceInfo>
    </AccessPolicies>
</dads>
``` where:

1) if isSharable=true, it indicates that other home networks are allowed to access the first home network; otherwise, other branch home networks are not allowed to access the first home network; and 2) deviceInfo describes sharable device information in the first home network, including an ID and other description information of the device and an ID "credentialID" of a home network capable of accessing the device. In this embodiment, two internal devices are listed, and a device of a device ID "abcd1234-11a1-22b2-c333-01001d12e001" may be accessed by a third home network having the "credentialID" being equal to "home c".

In the home network system provided by the embodiment of the present invention, through the secure channel established between the first home network and the second home network, and the secure channel between the second home network and the third home network, the second home network obtains the device information and the access policy from the first home network and sends the device information to the third home network according to the access policy, so that the third home network may share the device information in the first home network. In the home network system provided by the present invention, the secure channels are established only between the first home network and the second home network and between the second home network and the third home network, so that the number of the secure channels is reduced on a whole.

Figure 2:
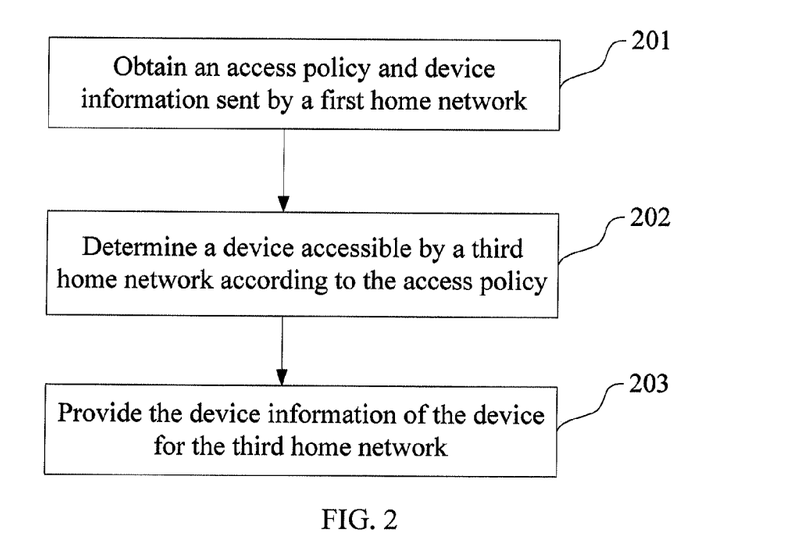
FIG. 2 is a flow chart of a method for sharing device information among home networks according to an embodiment of the present invention.

As shown in FIG. 2, an embodiment of the present invention provides a method for sharing device information among home networks. The method includes the following steps.

201: Obtain an access policy and device information sent by a first home network.

After a secure channel is established between a first home network and a second home network, the second home network obtains the access policy and the device information that are sent by the first home network through the secure channel.

A specific obtaining process may be implemented in two manners.

First Manner:

A UPnP control command is added, where the control command may be named as AddPolicies. The first home network adds the access policy in a certain service of the second home network by invoking the command, and the service may be RADASync.

A parameter list of AddPolicies is as follows.

| Argument | Direction |
| --- | --- |
| AccessPolicies | Input |
| ID | Input | where an input parameter AccessPolicies is of a character string type, and a value of the input parameter AccessPolicies may be description of the access policy in an XML format; and an input parameter ID of AddPolicies is of the character string type and is an optional parameter, and may be an ID of a device in the first home network or an ID of a home network providing the access policy.

The first home network transmits the AccessPolicies parameter to the second home network by invoking the AddPolicies command, that is, transmits the access policy to the second home network.

The second home network receives the access policy and the device information of the first home network that are carried in the parameter transmitted when the first home network invokes the AddPolicies command.

Second Manner:

The second home network demands the access policy from the first home network by invoking a UPnP control command.

A UPnP control command is added, where the control command may be named as GetPolicies. The second home network demands the access policy from the first home network by invoking the command.

A parameter list of the GetPolicies command is as follows.

| Argument | Direction |
| --- | --- |
| ID | Input |
| AccessPolicies | Output |
| ID | Output | where an input parameter ID is of the character string type and is an optional parameter, and a value of the input parameter ID may be an ID of a device in the second home network or an ID of the second home network;

an output parameter AccessPolicies is of the character string type, and a value of the output parameter AccessPolicies may be specific description of the access policy in the XML format; and an output parameter ID is of the character string type and is an optional parameter, and a corresponding status variable of the output parameter ID may be an ID of a device in the first home network or an ID of the first home network.

After knowing that the first home network establishes the secure channel with the second home network, the second home network may directly invoke the GetPolicies command. After the second home network invokes the command, the first home network sends the AccessPolicies parameter to the second home network. That is, the second home network may first send a request for demanding the access policy of the first home network to the first home network, and then receive the access policy and the device information of the first home network that are sent by the first home network.

When the second home network obtains the access policy and the device information of the first home network, the second home network may also first obtain an address of the device information and the access policy, and then obtain the device information and the access policy according to the address.

Corresponding to the AddPolices command and the GetPolicies command, the first home network sends the access policy and the device information also in two manners.

First manner: When the first home network invokes the AddPolicies command, the AccessPolicies parameter transmitted from the first home network to the second home network is an address for a storage module to store the access policy and the device information.

Second manner: When the second home network invokes the GetPolices command, the AccessPolicies parameter sent from the first home network to the second home network as a response is an address for the storage module to store the access policy and the device information.

At this time, the second home network obtains the access policy and the device information through a first secure channel according to the storage address of the access policy and the device information.

202: Determine a device accessible by a third home network according to the access policy.

After the access policy and the device information are obtained, where the access policy includes a right for the third home network to access a device in the first home network, the device in the first home network accessible by the third home network is determined according to the access policy.

203: Provide the device information of the device for the third home network.

After the third home network establishes a secure channel with the second home network, the device information corresponding to the device is provided for the third home network through the secure channel.

The second home network may provide the device information for the third home network in the following two manners.

First Manner:

A UPnP control command is added, where the control command may be named as AddRemoteDevices. The second home network adds the device information in a certain service of the third home network by invoking the command, and the service may be RADASync.

A parameter list of AddRemoteDevices is as follows.

| Argument | Direction |
|---|---|
| DeviceList | Input |
| ID | Input | where an input parameter DeviceList is of the character string type, and a value of the input parameter DeviceList may be description of the device information in the XML format; and an input parameter ID is of the character string type and is an optional parameter, and may be an ID of a device in the first home network or an ID of the first home network.

The second home network transmits the DeviceList parameter to the third home network by invoking the AddRemoteDevices command, that is, provides the device information for the third home network.

Second Manner:

The third home network demands the device information from the second home network by invoking a UPnP control command.

A UPnP control command is added, where the control command may be named as GetRemoteDevices. The third home network demands the device information from the second home network by invoking the GetRemoteDevices command.

A parameter list of the GetRemoteDevices command is as follows.

| Argument | Direction |
|---|---|
| ID | Input |
| DeviceList | Output |
| ID | Output | where an input parameter ID is of the character string type and is an optional parameter, and a value of the input parameter ID may be a device ID corresponding to the device information in the third home network or an ID of the third home network;

an output parameter DeviceList is of the character string type, and a value of the output parameter DeviceList may be specific description of the device information in the XML format; and an output parameter ID is of the character string type and is an optional parameter, and a value of the output parameter ID may be a device ID corresponding to device information in the first home network or an ID of the first home network.

After establishing the secure channel with the second home network, the third home network may directly invoke the GetRemoteDevices command. After the third home network invokes the command, the second home network sends the DeviceList parameter to the third home network. That is, the third home network first sends a request for demanding the device information to the second home network, and then receives the device information of the first home network sent by the second home network.

When intending to access the device after obtaining the device information, the third home network sends an access request for accessing the device to the second home network.

After receiving the access request, the second home network forwards the access request to the first home network.

After receiving the access request, the first home network responds to the access request and sends response information to the second home network. After receiving the response information, the second home network forwards the response information to the third home network, so that the third home network may access the device in the first home network.

In the method for sharing the device information among the home networks provided by the embodiment of the present invention, through the secure channels established between the first home network and the second home network and between the second home network and the third home network, the second home network obtains the device information and the access policy from the first home network and sends the device information to the third home network according to the access policy, so that the third home network may share the device information in the first home network. In the method for sharing the device information among the home networks provided by the present invention, the secure channels are established only between the first home network and the second home network and between the second home network and the third home network, so that the number of the secure channels is reduced on a whole.

Figure 3:
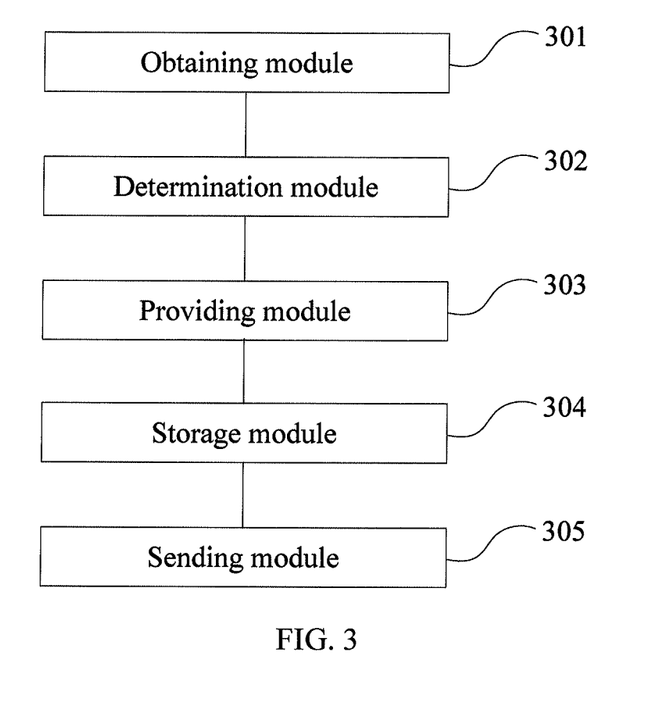
FIG. 3 is a structural diagram of a home network according to an embodiment of the present invention provides.

As shown in FIG. 3, an embodiment of the present invention provides a home network, which includes an obtaining module 301, a determination module 302, and a providing module 303.

The obtaining module 301 is configured to obtain an access policy and device information of a first home network through a first secure channel.

The determination module 302 is configured to determine, according to the access policy, a device that the first home network allows a third home network to access.

The providing module 303 is configured to provide information of the device determined by the determination module for the third home network through a second secure channel.

In the home network provided by the embodiment of the present invention, the access policy and the device information may be obtained, and the device information may be provided for the third home network according to the access policy, so that the third home network may share the device information in the first home network.

In other embodiments of the present invention, the obtaining module 301 is further configured to receive a storage address of the access policy and the device information of the first home network that are sent by the first home network and obtain the access policy and the device information of the first home network according to the storage address.

In the foregoing embodiment of the present invention, the home network may be configured to forward the device information. In other embodiments of the present invention, the home network may also be configured to provide the access policy and the device information or an address of the access policy and the device information. In these embodiments, the home network further includes a storage module 304 and a sending module 305.

The storage module 304 is configured to store the access policy and the device information of the home network.

The sending module 305 is configured to send the access policy and the device information of the home network or a storage address of the access policy and the device information of the home network to other home networks having secure channels established with the home network.

In the home network provided by the embodiment of the present invention, the home network provides the access policy and the device information or the address of the access policy and the device information for other home networks, so that other home networks may share the device information.

In other embodiments of the present invention, the home network may also be configured to receive the device information or the address of the device information. In these embodiments, the home network further includes a receiving module.

The receiving module is configured to receive the device information or the address of the device information sent by the other home networks.

In the home network provided by the embodiment of the present invention, the home network receives the device information or the address of the device information sent by other home networks, so that the device information of the other home networks may be shared.

Persons skilled in the art may understand that all or part of the steps of the method according to the embodiments of the present invention may be implemented by a program instructing relevant hardware. The program may be stored in a computer readable storage medium, such as a Read-Only Memory (ROM), a Random Access Memory (RAM), a magnetic disk or a Compact Disk Read-Only Memory (CD-ROM).

The above is only the specific implementation of the present invention, but the protection scope of the present invention is not limited herein. Any change or replacement that may be easily figured out by persons skilled in the art within the technical scope disclosed by the present invention shall be covered by the protection scope of the present invention. Therefore, the protection scope of the present invention shall be the protection scope of the claims.

What is claimed is:

1. A home network system, comprising:
  a first home network; and
  a second home network comprising hardware that executes program instructions and a memory having instructions stored therein that instruct the hardware, the second home network having a first secure channel established with the first home network, where the instructions configure the second home network to:
    obtain an access policy and device information of the first home network through the first secure channel, wherein a third home network is specified in the access policy of the first home network;
    establish a second secure channel with the third home network; and
    provide according to the access policy, the device information of the first home network to the third home network after having the second secure channel established with the third home network.

2. The home network system according to claim 1, wherein the instructions stored in the memory of the second home network comprise instructions of a plurality of modules which cause the home network system to perform functions, wherein the plurality of modules of the memory of the second home network comprise:
  an obtaining module, which causes the second home network to obtain the access policy and the device information of the first home network through the first secure channel;
  a determination module, which causes the second home network to determine according to the access policy, a device of the first home network, which the first home network allows the third home network to access; and
  a providing module, which causes the second home network to provide information of the device of the first home network to the third home network through the second secure channel.

3. The home network system according to claim 1, wherein the instructions stored in the memory of the second home network comprise instructions of a plurality of modules which cause the second home network to perform functions, wherein the plurality of modules of the memory of the second home network comprise:
  a receiving module, which causes the second home network to receive the access policy and the device information of the first home network through the first secure channel;
  a determination module, which causes the second home network to determine according to the access policy, a device of the first home network, which the first home network allows the third home network to access; and
  a providing module, which causes the second home network to provide information of the device to the third home network through the second secure channel.

4. The home network system according to claim 2, wherein the first home network comprises hardware that executes program instructions and a memory having instructions stored therein that instruct the hardware, the instructions stored in the memory of the first home network comprising instructions of a plurality of modules which cause the first home network to perform functions, wherein the plurality of modules of the memory of the first home network comprise:
- a storage module, which causes the first home network to store the access policy and the device information of the first home network; and
- a sending module, which causes the first home network to send an address of the access policy and the device information of the first home network to the second home network through the first secure channel;
- wherein the obtaining module of the second home network, which causes the second home network to obtain through the first secure channel the access policy and the device information of the first home network, obtains the access policy and device information of the first home network that are stored by the storage module according to the storage address of the access policy and the device information that are sent by the sending module of the first home network to the second home network.

5. The home network system according to claim 1 wherein the memory of the second home network stores codes of the access policy which enables a right for the third home network to access the device in the first home network.

6. A method for sharing device information among home networks, comprising:
in a second home network:
- obtaining an access policy and device information sent by a first home network;
- determining a device of the first home network, which is to be made accessible to a third home network according to the access policy, wherein the third home network is specified in the access policy sent by the first home network; and
- providing information of the accessible device of the first home network to the third home network.

7. The method for sharing device information among home networks according to claim 6, wherein the access policy comprises a right for the third home network to access the device in the first home network.

8. The method for sharing device information among home networks according to claim 6, wherein the obtaining of the access policy and the device information that are sent by the first home network comprises:
- receiving the access policy and the device information sent by the first home network; or
- receiving storage address information of the access policy and the device information sent by the first home network, and obtaining the access policy and the device information according to the storage address information.

9. The method for sharing device information among home networks according to claim 6, further comprising:
- receiving an access request sent by the third home network for accessing the device of the first home network according to the information of the accessible device;
- forwarding the access request to the first home network;
- receiving from the first home network, a response produced according to the access request; and
- forwarding the response from the first home network to the third home network.

10. The method for sharing device information among home networks according claim 8, further comprising:
- receiving an access request sent by the third home network for accessing the device of the first home network according to the information of the accessible device;
- forwarding the access request to the first home network; and
- receiving from the first home network, a response produced according to the access request; and
- forwarding the response to the third home network.

11. A home network, comprises hardware that executes program instructions and a memory having instructions stored therein that instruct the hardware, the instructions comprising a plurality of modules which cause the home network to perform functions, wherein the plurality of modules of the memory comprise:
- an obtaining module, which causes the home network to obtain an access policy and device information of a first home network through a first secure channel;
- a determination module, which causes the home network to determine according to the access policy of the first home network, a device that the first home network allows a third home network to access, wherein the third home network is specified in the access policy of the first home network; and
- a providing module, which causes the home network to provide information of the device to the third home network through a second secure channel.

12. The home network according to claim 11, wherein the obtaining module causes the home network to:
- receive the access policy and the device information of the first home network sent by the first home network through the first secure channel, or
- receive a storage address of the access policy and the device information of the first home network that are sent by the first home network, and obtain the access policy and the device information of the first home network according to the storage address.

13. The home network according to claim 11, wherein the plurality of modules of the memory further comprise:
- a sending module, which causes the home network to send an access policy and device information of the home network itself to other home networks having secure channels established with the home network.

14. The home network according to claim 12, wherein the plurality of modules of the memory further comprise:
- a sending module, which causes the home network to send an access policy and device information of the home network itself to other home networks having secure channels established with the home network.

15. The home network according to claim 13, wherein the plurality of modules of the memory further comprise:
- a storage module, which causes the home network to store the access policy and the device information of the home network, wherein
- the sending module which causes the home network to send the storage address of the access policy and the device information of the home network to the other home networks having the secure channels established with the home network.

* * * * *